(12) United States Patent
Hoyt et al.

(10) Patent No.: US 8,988,224 B2
(45) Date of Patent: *Mar. 24, 2015

(54) ENHANCING THE EFFICIENCY OF ENERGY TRANSFER TO/FROM PASSIVE ID CIRCUITS USING FERRITE CORES

(71) Applicant: Magnet Consulting, Inc., Los Angeles, CA (US)

(72) Inventors: Joshua K. Hoyt, Portland, OR (US); Forrest S. Seitz, Beaverton, OR (US)

(73) Assignee: Magnet Consulting, Inc., Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,466

(22) Filed: Apr. 9, 2013

(65) Prior Publication Data

US 2013/0233923 A1 Sep. 12, 2013

Related U.S. Application Data

(63) Continuation of application No. 12/351,774, filed on Jan. 9, 2009, now Pat. No. 8,432,283.

(60) Provisional application No. 61/020,543, filed on Jan. 11, 2008.

(51) Int. Cl.
*G08B 13/14* (2006.01)
*G06K 19/06* (2006.01)
(Continued)

(52) U.S. Cl.
CPC .............. *G06K 19/0723* (2013.01); *H04Q 9/00* (2013.01); *H01Q 7/08* (2013.01); *H04Q 2209/47* (2013.01); *H04Q 2209/88* (2013.01)
USPC ..................... 340/572.1; 340/572.7; 235/492; 343/748; 343/751

(58) Field of Classification Search
USPC ............. 340/572.1, 572.7; 235/492; 434/339, 434/356, 359; 343/748, 751, 866, 750
See application file for complete search history.

(56) References Cited

U.S. PATENT DOCUMENTS 2,339,234 A  1/1944  Polydoroff
2,579,978 A  12/1951  Snoek et al.
(Continued)

FOREIGN PATENT DOCUMENTS

CN  1361906  7/2002
CN  1639911  7/2005
(Continued)

OTHER PUBLICATIONS

Magellan Technology, White Paper, "Comparison between 125kHz Low Frequency (LF) and 13.56 MHz High Frequency (HF)," RTF, Sydney. Jul. 5, 2005.
(Continued)

*Primary Examiner* — Steven Lim
*Assistant Examiner* — Omeed Alizada
(74) *Attorney, Agent, or Firm* — Fountainhead Law Group P.C.

(57) ABSTRACT

In one embodiment the present invention includes an RFID gaming token with a ferrite core. When the RFID gaming tokens are stacked, the ferrite cores steer the flux field from the excitation antenna through the center of the annular antennas in each token. The resulting flux field increases the efficiency of the energy transfer from the excitation antenna to the passive tags. This increased efficiency also improves the data transfer to and from the passive tags. This increased efficiency allows for reading RFID gaming tokens at a higher stack height (or at a better error rate for a given stack height) as compared to existing air core gaming tokens.

33 Claims, 11 Drawing Sheets

(51) Int. Cl.
*G06K 19/07* (2006.01)
*H04Q 9/00* (2006.01)
*H01Q 7/08* (2006.01)

(56) References Cited

U.S. PATENT DOCUMENTS

| | | |
|---|---|---|
| 6,021,949 A | 2/2000 | Boiron |
| 6,134,130 A | 10/2000 | Connell et al. |
| 6,518,884 B1 | 2/2003 | Tanji et al. |
| 6,581,747 B1 | 6/2003 | Charlier et al. |
| 6,980,077 B1 | 12/2005 | Chandrasekaran et al. |
| 7,088,304 B2 | 8/2006 | Endo et al. |
| 7,119,664 B2 | 10/2006 | Roesner |
| 7,262,680 B2 | 8/2007 | Wang |
| 7,268,687 B2 | 9/2007 | Egbert et al. |
| 7,482,930 B2 | 1/2009 | Song et al. |
| 7,503,491 B2 | 3/2009 | Zhu et al. |
| 7,918,455 B2 | 4/2011 | Chapet et al. |
| 8,395,525 B2 | 3/2013 | Hoyt et al. |
| 2002/0180602 A1 | 12/2002 | Yoakum |
| 2006/0202804 A1 | 9/2006 | Vijay-Pillai et al. |
| 2007/0060311 A1 | 3/2007 | Rowe et al. |
| 2007/0096881 A1 | 5/2007 | Pillai |
| 2007/0114846 A1 | 5/2007 | Pavlovic |
| 2007/0171065 A1 | 7/2007 | Ku et al. |
| 2007/0194931 A1 | 8/2007 | Miller et al. |
| 2007/0200712 A1 | 8/2007 | Ameson et al. |
| 2008/0003457 A1 | 1/2008 | Endo |
| 2008/0048834 A1 | 2/2008 | Lenevez |
| 2008/0180249 A1 | 7/2008 | Butler et al. |
| 2009/0221364 A1 | 9/2009 | Richard et al. |
| 2009/0267742 A1 | 10/2009 | Hecht et al. |

FOREIGN PATENT DOCUMENTS

| | | |
|---|---|---|
| CN | 1706205 A | 12/2005 |
| CN | 1871743 | 11/2006 |
| CN | 1996349 | 7/2007 |
| WO | 2007030862 A1 | 3/2007 |

OTHER PUBLICATIONS

Megellan Technology, Product List, Inlets and Labels, May 2007.
Megellan Technology, White Paper, "A Comparison of RFID Frequencies and Protocols," Mar. 31, 2006.
Infineon, Short Product Information, Dec. 2005.
International Search Report (from a corresponding foreign application), PCT/US10/020553, mailed May 3, 2010.
International Search Report (from a corresponding foreign application), PCT/US2009/041275, mailed Jun. 16, 2009.
International Search Report (from a corresponding foreign application), PCT/US09/030679, mailed Mar. 2, 2009.
International Search Report (from a corresponding foreign application), PCT/US2009/035144, mailed Apr. 27, 2009.
Office Action for Chinese Patent Application No. 200980106434.7 mailed Jun. 5, 2012.
Chinese Search Report dated Sep. 24, 2012 for Application No. 200980101982.0 filed Jan. 9, 2009.
U.S. Appl. No. 12/392,736, filed Feb. 29, 2009 titled "Extending the Read Range of Passive RFID Tags".
U.S. Appl. No. 12/351,774, filed Jan. 9, 2009 titled "Enhancing the Efficiency of Energy Transfer to/from Passive ID Circuits Using Ferrite Cores".

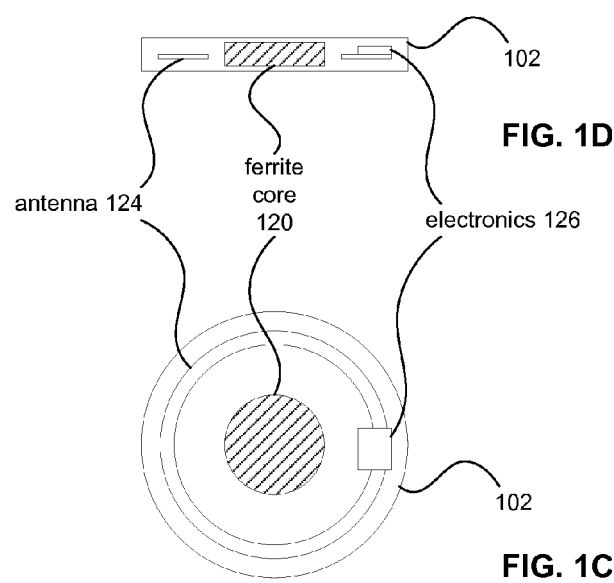
FIG. 1D
FIG. 1C
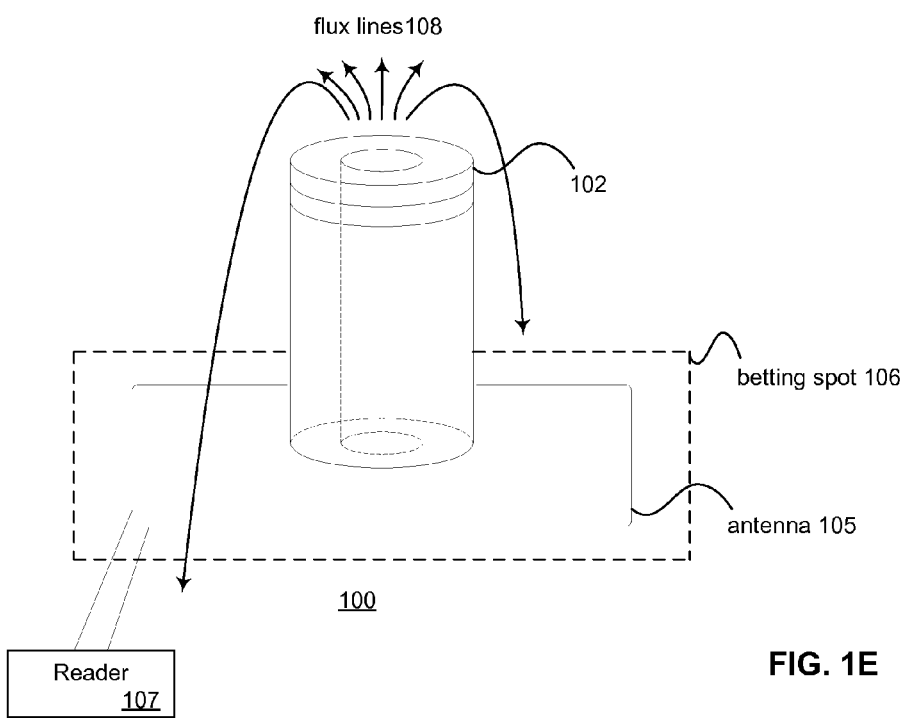
FIG. 1E $$\frac{T}{t} = \% \text{ Ferrite}$$

(12)

ENHANCING THE EFFICIENCY OF ENERGY TRANSFER TO/FROM PASSIVE ID CIRCUITS USING FERRITE CORES

CROSS REFERENCE TO RELATED APPLICATIONS

The present application is a continuation of U.S. application Ser. No. 12/351,774 filed Jan. 9, 2009 and titled "Enhancing the Efficiency of Energy Transfer to/from Passive ID Circuits Using Ferrite Cores", which claims priority to U.S. Provisional Application No. 61/020,543 filed Jan. 11, 2008 and titled "Enhancing the Efficiency of Energy Transfer to/from Passive ID Circuits Using Ferrite Cores", all of which are incorporated herein by reference.

BACKGROUND

The present invention relates to radio frequency identification (RFID) tags, and in particular, to RFID tags having a ferrite core.

Unless otherwise indicated herein, the approaches described in this section are not prior art to the claims in this application and are not admitted to be prior art by inclusion in this section.

The quality factor (also referred to as the "Q factor" or "Q") is a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. Regarding RFID circuits, Q is a measure of the "quality" desired in a good tuned circuit or other resonator.

More specifically, when an RFID tag is driven by a sinusoidal drive, its resonant behavior depends strongly on Q. Resonant systems respond to frequencies close to their natural frequency much more strongly than they respond to other frequencies. A RFID tag with a high Q resonates with a greater amplitude (at the resonant frequency) than one with a low Q factor. The amplitude of the resonant response affects the read range. To increase sensitivity and read range, many existing RFID tags have a relatively high Q. As a specific example, the Q of many existing RFID tags is between 10 and 20.

When multiple tags are in close proximity, however, they tend to interact. This interaction changes their resonant frequency of operation. Instead of a single resonance at the desired frequency, this interaction results in multiple resonances at undesirable frequencies. As a result, the tags are not energized and/or data is not successfully exchanged when the tags are in close proximity. Various approaches may be used to mitigate this interaction, but these strategies may reduce the read range. Compensating this reduction in read range by increasing the power output of the reader is possible but not always practical.

Thus, there is a need to read RFID tags in close proximity, and to do so with an acceptable read range.

SUMMARY

Embodiments of the present invention improve the read range of RFID tags. In one embodiment the present invention includes a radio frequency identification (RFID) tag. The RFID tag includes a magnetically permeable core, an antenna that receives electromagnetic energy, and tag electronics that identify the RFID tag in response to receiving the electromagnetic energy.

The magnetically permeable core may have various attributes according to various embodiments. The magnetically permeable core may be constructed of ferrite material. The magnetically permeable core may steer a magnetic flux field of the RFID tag. The magnetically permeable core may deform a magnetic flux component of the electromagnetic energy. The magnetic flux component, having been deformed, may concentrate flux lines through the magnetically permeable core. The flux lines, having been concentrated, may couple the electromagnetic energy to the antenna with an increased efficiency as compared to lacking the magnetically permeable core. The RFID tag may be one of a plurality of RFID tags that, when stacked, result in a stack with a solid rod of magnetically permeable material that further steers a magnetic flux field up through the stack. The magnetically permeable core may steer a magnetic flux field of the RFID tag, and steering the magnetic flux field may increase a read height of the RFID tag. The magnetically permeable core may have a permeability between 100 and 150. The magnetically permeable core may correspond to a nickel zinc ferrite material having a permeability between 100 and 150. The magnetically permeable core may improve an efficiency of energy transfer from a reader device that generates the electromagnetic energy to the RFID tag. The magnetically permeable core may improve an efficiency of data transfer from a reader device that generates the electromagnetic energy to the RFID tag. The magnetically permeable core may improve an efficiency of data transfer from the RFID tag to a reader device that generates the electromagnetic energy.

The tag electronics may have various attributes according to various embodiments. The tag electronics may identify the RFID tag by modulating a carrier frequency of the electromagnetic energy. The tag electronics may identify the RFID tag by modulating a carrier frequency of the electromagnetic energy according to a modified Aloha protocol.

The antenna may have various attributes according to various embodiments. The antenna may be an annular antenna. The antenna may be an annular antenna that surrounds the magnetically permeable core. The antenna may have a Q of less than 5. The antenna may have a Q of less than 1. The antenna may be untuned.

The magnetically permeable core may be one of many magnetically permeable cores in a device. The tag electronics may be part of a set of tag electronics that provide multiple identifications of a device. The antenna may be one of multiple antennas in a device.

The RFID tag may be one of many similar RFID tags. When the tags are stacked and a small gap results between the cores of tags in the stack, an increased signal strength between 24 dB and 10 dB may result, when the small gap is between 0% and 9%. When the tags are stacked, the tags may be misaligned, yet the overlapping cores steer a magnetic flux.

The RFID tag may be part of an RFID system. The RFID system may include a reader system that generates the electromagnetic energy. The reader system may include a number of reader antennas that generate the electromagnetic energy to read the RFID tag in proximity to one of the reader antennas.

The following detailed description and accompanying drawings provide a better understanding of the nature and advantages of the present invention.

BRIEF DESCRIPTION OF THE DRAWINGS

FIGS. 1A-1E show an RFID gaming system 100 according to an embodiment of the present invention.

DETAILED DESCRIPTION

Figure 1A:
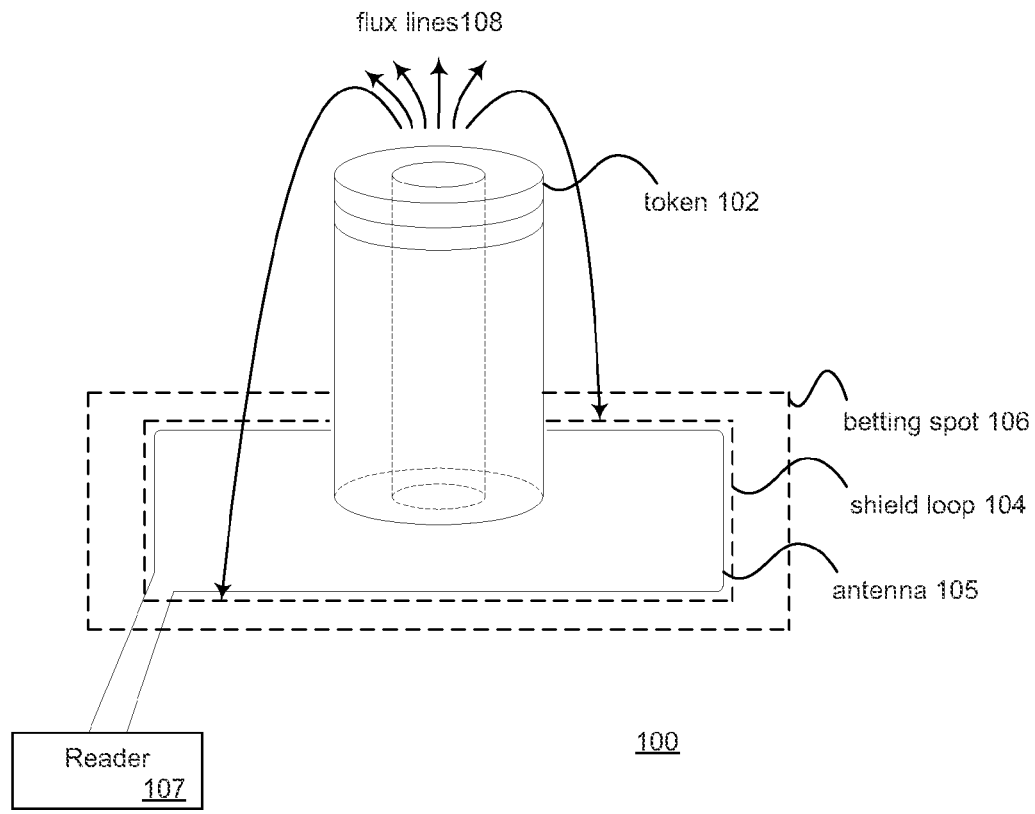

Described herein are techniques for improved radio frequency identification (RFID) reading. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

An embodiment of the present invention is directed to an RFID tag in a gaming environment. For ease of description, the gaming environment provides context for describing an embodiment. It is to be understood that the form factor of RFID tags may be adjusted, and that RFID tags embodying principles of the invention may be used in environments other than gaming environments.

Although the description uses the term "ferrite", this term is to be broadly interpreted to refer to any type of magnetically permeable material. In general, a material is magnetically permeable if its magnetic permeability is greater than that of air.

One feature of an embodiment is that the amount of energy that may be scavenged by each RFID tag from the excitation (reader) antenna is increased, as compared to many existing RFID systems. Another feature of an embodiment is that the efficiency of the energy transfer from the excitation (reader) antenna to the RFID tag is increased, as compared to many existing RFID systems. Another feature of an embodiment is that the efficiency of the data transfer from the excitation (reader) antenna to the RFID tag is increased, as compared to many existing RFID systems. Another feature of an embodiment is that the efficiency of the data transfer from the RFID tag back to the reader antenna is increased, as compared to many existing RFID systems. These increases in energy and data transfer may include one or more of the following features according to an embodiment: increased stack height of gaming tokens that can be read (resulting from increased read range); reduced read errors within a stack of gaming tokens; improved discrimination between tokens inside a "betting spot" and tokens outside the betting spot; and improved read times.

As further detailed below, a gaming token embodiment includes a RFID tag with a ferrite core that steers the magnetic flux emanating from an excitation source. In a gaming environment, where gaming tokens may be stacked in a column, the ferrite materials in the center of the token efficiently steer the magnetic flux up the stack to energize all the chips in the stack. The excitation source (reader antenna) may be embedded in the playing surface of the gaming table.

In contrast, typical RFID readers (using tags without a ferrite core; sometimes referred to as "air core" tags) radiate their energy broadly. This less efficient coupling between reader and tags is a significant factor in read range.

The presence of the ferrite core, according to an embodiment, may enable one or more of the following features as compared to air core tokens:

1. The increased efficiency of the coupling between the excitation (reader) source and the passive gaming token extends the read range of the "tag-reader" system.
2. The increased efficiency of the coupling between the excitation source and the passive gaming token allows the system designer to trade off read range in exchange for a gaming token with a lower "Q" with little or no net negative impact on read range. Assuming sufficient energy is available to power the RFID tag, this lower Q can minimize sensitivity to the interaction that results when multiple tags are in close proximity.
3. Sufficient energy can be transferred to the passive circuitry in the token that a more powerful processor can be used to achieve improved data rates, security, and error detection/correction.
4. The increased efficiency of the coupling between the gaming token and the excitation source can be used to achieve improved data rates, security, and error detection/correction.
5. Controlling the shape of the h-field makes it easier to discriminate between tokens that should be read (i.e., tokens that are in a selected betting zone) from tokens that should not be read (i.e., tokens that are not in the selected betting zone). This will minimize read errors due to cross-talk between adjacent betting zones.

General Description

FIGS. 1A, 1B, 1C, 1D and 1E show an RFID gaming system 100 according to an embodiment of the present invention.

FIG. 1A shows a number of gaming tokens 102 stacked within a shielding loop 104 that surrounds a betting spot 106. The betting spot 106 may be located on a gaming table (not shown) on which the gaming tokens 102 may be placed to make a bet. The gaming table may include a reader 107 that has an RFID antenna 105 and other RFID reader electronics (not shown) for reading an RFID tag located within each gaming token 102.

The shielding loop 104 constrains flux lines 108 generated by the gaming tokens 102 in response to electromagnetic energy emitted by the RFID reader. (The details of the shielding loop 104 may be as described in U.S. Pat. No. 8,395,507 for "H-Field Shaping Using a Shorting Loop" filed Apr. 21, 2008.) The flux lines 108 (also referred to as the h-field) are generated by the RFID reader. The gaming tokens 102 are energized by this field. This field can be modulated by either the reader (for a data uplink to the tokens) or the gaming tokens 102 (for a data downlink to the reader). According to an alternative embodiment shown in FIG. 1E, the shielding loop 104 may be omitted. (Note the difference in the flux lines 108 between FIG. 1E and FIG. 1A.)

Figure 1B:
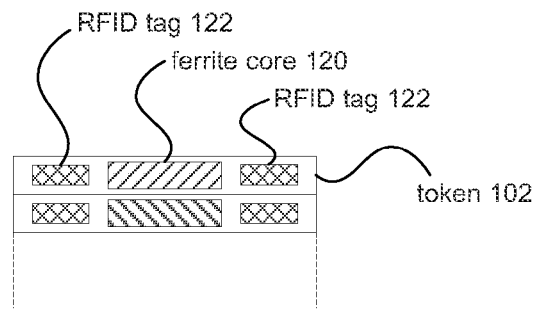

FIG. 1B is a cut away side view showing more details of the gaming tokens 102. Each gaming token 102 includes a ferrite core 120 and an annular RFID tag 122.

FIG. 1C shows a cut-away top view of the gaming token 102. The ferrite core 120 can be seen, as well as a loop antenna 124 as a component of the RFID tag 122.

FIG. 1D shows a cross-sectional view of the gaming token 102. The ferrite core 120 can be seen, as well as the loop antenna 124 and the other electronics 126 of the RFID tag 122.

The RFID tag 122 may be magnetically coupled. That is, although the electromagnetic radiation involved in RFID applications includes both an electrical field (e-field) and a magnetic field (h-field), an embodiment of the present invention uses the magnetic field. Essentially, a transformer is formed, with one winding in the excitation antenna in the reader and the other winding in the antenna 124. In many existing RFID systems, the transformer has an "air core". This air core may be inefficient, but this inefficiency may be a necessary tradeoff when not knowing the location of the RFID tag. In contrast, embodiments of the present invention use a "ferrite core" to improve the performance of the transformer created by the excitation antenna and the antenna 124. The use of ferrite cores is particularly effective when the gaming tokens 102 are stacked and the ferrite cores 120 deform the magnetic flux component of the electromagnetic energy received from the reader. This deformation of the magnetic flux concentrates the flux lines through the ferrite cores 120. The concentrated flux lines through the core 120 couple the electromagnetic energy in a more efficient manner than in a token 102 that lacks the ferrite core 120. In effect, the ferrite cores 120 steer the flux field to improve performance, as more fully described below.

The antenna 124 scavenges electromagnetic energy (for example, from the h-field) from the reader. The other electronics 126 rectifies the energy and uses the energy to drive a processor. Data transfer can be superposed on the carrier using modulation. The processor modulates a carrier to perform data transfer to identify the RFID tag 122. According to one embodiment, a 13.56 MHz carrier is used. The carrier frequency 13.56 MHz has been found to couple well to ferrites.

Figure 2A:
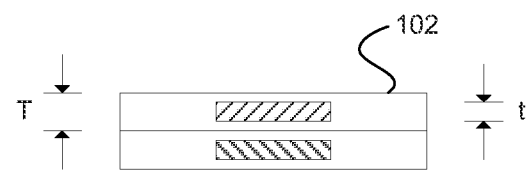
FIGS. 2A, 2B and 2C show various aspects of the performance of embodiments of the present invention.
Figure 2B:
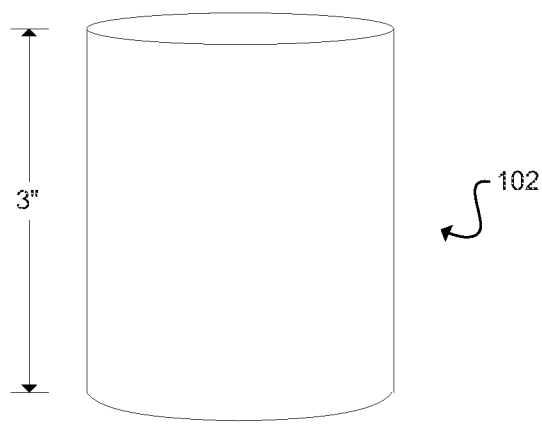
Figure 2C:
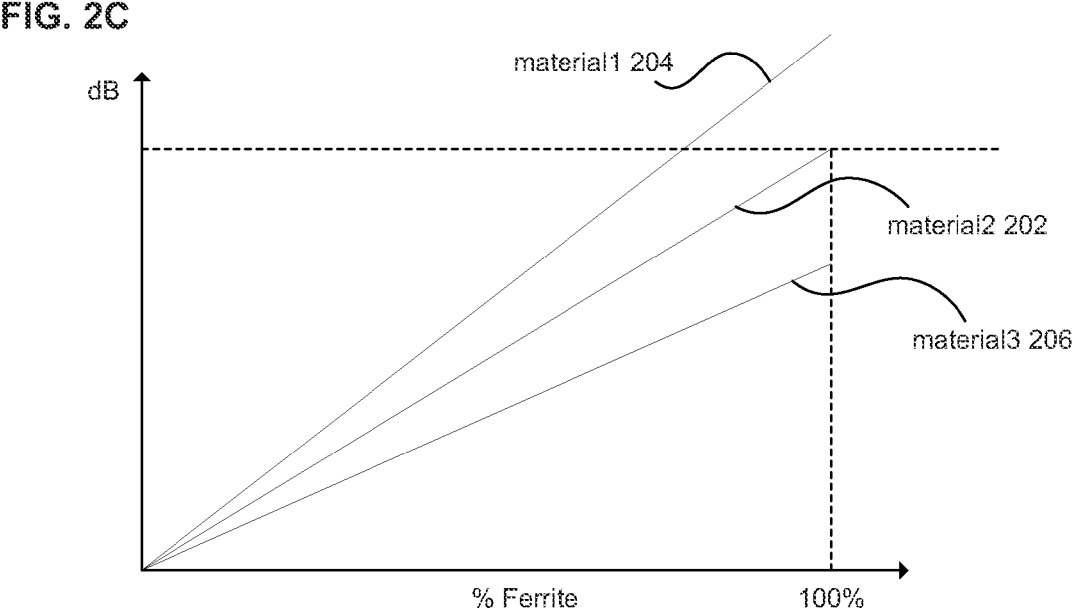

FIGS. 2A, 2B and 2C show various aspects of the performance of embodiments of the present invention.

FIG. 2A is a cut away side view showing two stacked gaming tokens 102. Each gaming token 102 has a ferrite core 120. The thickness of the gaming token 102 is T and the thickness of the ferrite core is t. The ratio t/T is referred to as the "% ferrite".

FIG. 2B is a perspective view showing a number of gaming tokens 102 stacked at a stack height of 3 inches. This stack height is used to compare embodiments of the present invention to other techniques.

FIG. 2C is a graph showing the performance of various materials. The x-axis shows the "% ferrite" (see FIG. 2A and related discussion) and the y-axis shows the signal strength. (The "% ferrite" of 100% indicates that the thickness of the ferrite core 120 is the same as the thickness of the gaming token 102.) For the material "material2", the line 202 shows the received signal strength of "dB" at 100%. Given line 202 as a baseline for the desired signal strength, other materials may be used to give different performance characteristics. For example, the material "material1" shown by the line 204 indicates a thinner ferrite core 120 can be used to give the same performance as "material2". The material "material3" shown by the line 206 indicates a thicker ferrite core 120 is needed to give the same performance as "material2". As can be seen, more ferrite as a percentage of the thickness of the gaming token 102 gives a stronger signal. In addition, different ferrite materials have different performance characteristics.

Figure 3:
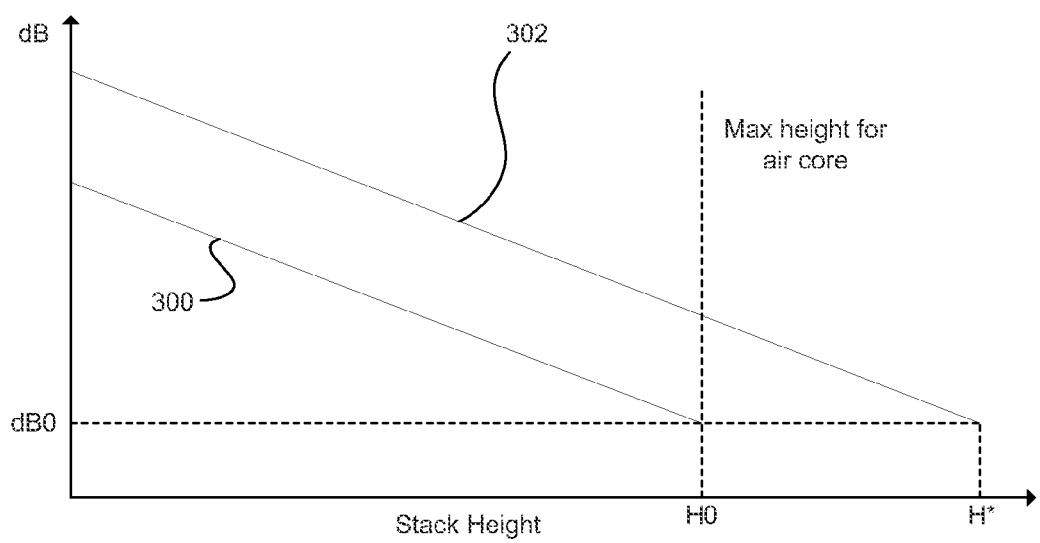
FIG. 3 is a graph showing a comparison between an existing air core RFID tag and a ferrite core RFID tag according to an embodiment of the present invention.

FIG. 3 is a graph showing a comparison between an existing air core RFID tag and a ferrite core RFID tag according to an embodiment of the present invention. The x-axis shows the stack height of a stack of gaming tokens 102 (see FIG. 1A) and the y-axis shows the signal strength of the signal received by the topmost gaming token in the stack. For an air core RFID tag, the line 300 has a signal strength dB0 at the stack height H0. This stack height H0 may correspond to approximately 2.5 inches in existing systems. For a ferrite core RFID tag, the line 302 has the signal strength dB0 at the stack height H*. The stack height H* is greater than the stack height H0. Thus, embodiments of the present invention allow reading at greater stack heights as compared to existing systems. Correspondingly, for a given stack height H0, the received signal strength of the line 302 is greater than that of the line 300. Thus, embodiments of the present invention provide improvement in read height as compared to existing systems. In effect, the multiple stacked tags create a rod of ferrite material that steers the magnetic flux field up through the stack.

As discussed above, many existing RFID tags have a relatively high Q. The Q is relatively high to increase sensitivity and read range. However, when multiple tags are in close proximity, they tend to interact. This interaction changes their resonant frequency of operation. As a result, the tags are not energized and/or data is not successfully exchanged.

According to an embodiment of the present invention, the antennas in the gaming tokens 102 have a relatively lower Q than those in existing RFID tags. Having a relatively lower Q may also be referred to as being de-tuned. De-tuning helps to address the problem of unwanted interactions between tags, but also severely limits sensitivity and hence the read range. In contrast to many existing air core RFID tags, embodiments of the proposed invention use ferrite cores 120 to compensate for this loss of read range. When these gaming tokens 102 are stacked, the ferrite cores 120 concentrate the h-field and steer the flux. This allows the use of de-tuned tags which are not compromised by the presence of adjacent tags. The decrease in sensitivity from de-tuning is offset by the focused h-field. The result: the ability to read multiple tags in close proximity while maintaining excellent read range. In contrast, many existing air core RFID tags either cannot be read in close proximity or suffer in read range.

As a specific example, the Q of many existing RFID tags is between 10 and 20, whereas the Q of the antennas in the gaming tokens 102 is close to zero (in fact, a designer may want to make the Q as close to zero as possible). Ideally, the antenna in the gaming token 102 may present itself as a pure resistive load. In practice, however, there is parasitic capacitance that contributes to a modest Q (less than 1). For the system designer, one notable factor that determines what Q is possible (to maximize read range) is how closely coupled the tags are—which is dependent on how closely spaced they are. According to an embodiment, tags with a Q less than 5.0 provide an acceptable read range. According to an embodiment, tags with a Q less than 1.0 provide an improved read range.

According to an embodiment, the antennas in the gaming tokens 102 are untuned and have a resonance frequency that is well above 13.56 MHz. The lack of a tuned antenna limits sensitivity and hence the read range. As with the low Q antenna embodiment discussed above, the ferrite cores 120 concentrate the h-field and steer the flux, allowing the use of untuned tags which are not compromised by the presence of adjacent tags.

Modulation Details

Figure 4:
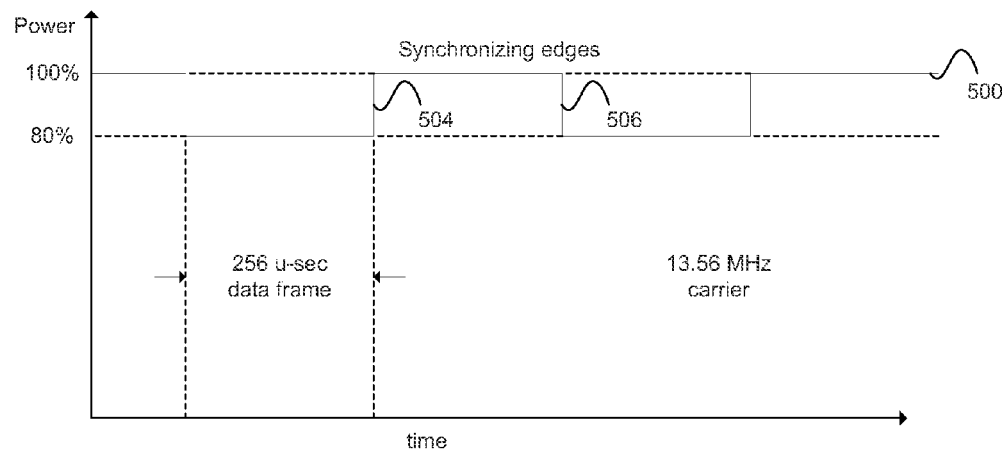
FIG. 4 is a graph of a waveform showing a basic modulation scheme used by an embodiment of the present invention.

FIG. 4 is a graph of a waveform 500 showing a basic modulation scheme used by an embodiment of the present invention. The x-axis corresponds to time and the y-axis corresponds to power level. The power output is modulated at approximately 4 KHz with the amplitude shifting between 100% (equivalent to a digital 1) and 80% (equivalent to a digital 0). This selection in amplitudes is a balance between maximizing the energy available to the tag and insuring that the signal strength of the digital data is sufficient to detect. The 256 u-second frame 502 is the basic frame of communication from the tag to the reader. This frame was chosen to be long enough for the required command and data strings (see below for detailed description of command structure). The edges (e.g., 504 and 506) of the 256 u-second frame are used to synchronize the tags with the reader.

Other modulation schemes may be used according to other embodiments, as desired according to design requirements. For example, the modulation frequency may be adjusted. As another example, the power levels for "1" and "0" may be shifted. As another example, the size of the data frame may be adjusted.

Tag Bits

Generic RFID uses up to 96 bits for unique serial numbers. Unlike generic RFID, the serial numbers for a closed environment need not be so long. A shorter serial number can improve read cycle times and reduce error rates. Using an estimate of 1 million tokens used in each of 1,000 closed environments, it was deemed that a universe of 1 billion (approximately 2E30) unique serial numbers is sufficient for an embodiment. Allowing for the discard of undesirable numbers with poor DC balance or too many successive 1s or 0s, a base serial number of 31 bits was chosen in an embodiment.

CRC checks may be used to insure that data is not corrupted during transmission. In general, the more CRC bits, the more robust the error detection—but with diminishing returns. A 13 bit CRC was chosen as a reasonable compromise between robustness and overhead, according to an embodiment. The CRC may be calculated using a polynomial, such as 0x1909, according to an embodiment. In other embodiments, other error detection or error correction schemes may be used.

Downlink Details

Figure 5:
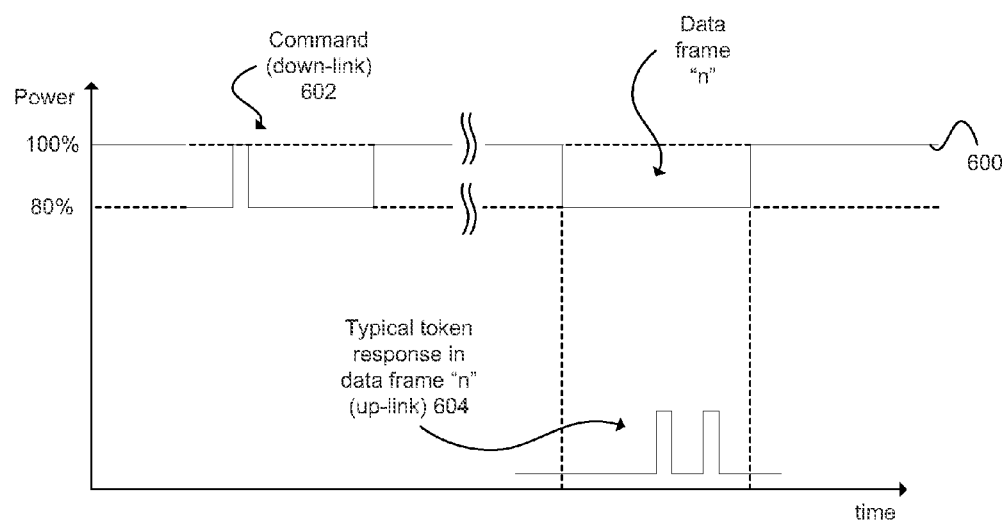
FIG. 5 is a graph of a waveform showing a typical command-response sequence according to an embodiment of the present invention.

FIG. 5 is a graph of a waveform 600 showing a typical command-response sequence according to an embodiment of the present invention. The basic command structure is one of "master-slave" with all commands initiated by the reader. A complete read cycle starts when the 13.56 MHz carrier signal is powered up and ends when all tokens have been read and the carrier powered down. The waveform 600 shows a typical command-response sequence with "down-link" (reader to tag) commands 602 and "up-link" (tag to reader) responses 604. The reader may use a READ command to read tags.

Because of the statistical likelihood of collisions, a complete read cycle may require multiple READ commands to read all tokens.

According to an embodiment, a SLEEP command may also be implemented. The SLEEP command may be as disclosed in U.S. Pat. No. 8,395,525 for "Extending the Read Range of Passive RFID Tags", filed Feb. 25, 2009.

READ Command Details

The READ command includes two components according to an embodiment. One components is the iteration number. Another component is the window number.

The purpose of the iteration number is to eliminate repeated collisions from the same tokens during subsequent READ commands. A process in the token firmware determines which bits of the unique token ID are used to "randomly" select a response window. Because the iteration number is different for each read command in a given cycle, the likelihood of two tokens repeatedly colliding is minimized. The iteration number increments from 0 to 9. A special iteration number of 11 may be used for diagnostic purposes.

As noted above, the function of the modified Aloha protocol is improved when the number of tags in the field can be estimated, constrained (e.g., by limiting the physical area that may be occupied by tags), or otherwise known. (According to an embodiment, the number of tags may be estimated as disclosed in U.S. Provisional Application No. 61/046,690 for "Estimating the Number of RFID Tags in the Field", filed Apr. 21, 2008. One feature of the ferrite core is that the close coupling of the tokens to the antenna results in an antenna impedance that is proportional to the number of tokens. This allows the reader to measure the antenna impedance, estimate the number of tokens in the excitation field, and dynamically adjust the number of response windows by including this variable in the command structure.) This information can be used to set the number of data frames for the responses. Too many data frames results in longer read cycle times. Too few data frames results in excess collisions from multiple tokens responding within the same data frame. It has been determined that good results occur when the number of data frames is approximately ten times the number of tokens. Alternatively, the number of tags can be estimated by using a moderate number of windows and seeing how many collisions there are, and then adjusting the number of windows upward or downward accordingly.

TABLE 1A shows the structure of the 16-bit READ command, starting from the most significant bit (MSB).

TABLE 1A

| | Bit | | | | |
|---|---|---|---|---|---|
| | 15 | 14 | 13-10 | 9-7 | 6-0 |
| Function | START bit | READ command | Iteration # | Window # | STOP bits |
| Value | 1 | 0 | 0-9 | 0-7 | 0 |

TABLE 1B shows the number of frames corresponding to each window number.

TABLE 1B

| | Window # | | | | | | | |
|---|---|---|---|---|---|---|---|---|
| | 0 | 1 | 2 | 3 | 4 | 5 | 6 | 7 |
| # of frames | 32 | 64 | 128 | 256 | 512 | 1024 | 2048 | reserved |
| Read time | 8 msec | 16 msec | 32 msec | 64 msec | 128 msec | 256 msec | 512 msec | n/a |

Uplink Details

According to an embodiment, the up-link data rate is 4 u-seconds/bit, thereby allowing the entire token ID of 46 bits to fit inside a single 256 u-second frame. The 4 u-second rate corresponds to the clock of the microprocessor in the tag. According to an embodiment, the microprocessor in the tag is a PIC microcontroller (PIC10F206T-I/OT from Microchip Technology Inc., Chandler, Ariz.). The reader DSP (digital signal processor) over-samples this data, leveraging its much higher processing power. As shown in TABLE 2, the 46 bit structure consists of a start bit, a 31 bit token ID, a 13 bit CRC, and one stop bit.

TABLE 2

| | Bit | | | |
|---|---|---|---|---|
| | 45 | 44-14 | 13-1 | 0 |
| Function | START bit | Token ID | CRC | STOP bit |
| Value | 1 | 0 or 1 | 0 or 1 | 1 |

Read Cycle Example

Assume a stack of 30 tokens in the betting area. The reader will detect this load and assign a window number of either 3 or 4. Assuming the worst case (4), the corresponding number of frames is 512—or 128 m-seconds to process this initial READ command. Assume a 10% collision rate—resulting in 3 unread tokens. Putting 27 tokens to sleep requires an additional 35 m-seconds. A second READ command using a window number of 0 corresponds to 32 frames or 8 m-seconds. If no collisions are detected on this second READ command, the total elapsed time for the read cycle is 171 m-seconds.

According to an alternative embodiment, 44 m-seconds are used to put 27 tokens to sleep, resulting in a total elapsed time for the read cycle of 180 m-seconds.

The uplink signal is essentially amplitude modulated, however, the phase of the returned signal is unknown due to the phase shift from the reader to the tag and the tag to the reader. To address this unknown phase shift, the receiver mixes the signal down to baseband creating I and Q channels. These I and Q channels are processed to recover the data from the tag.

Figure 6:
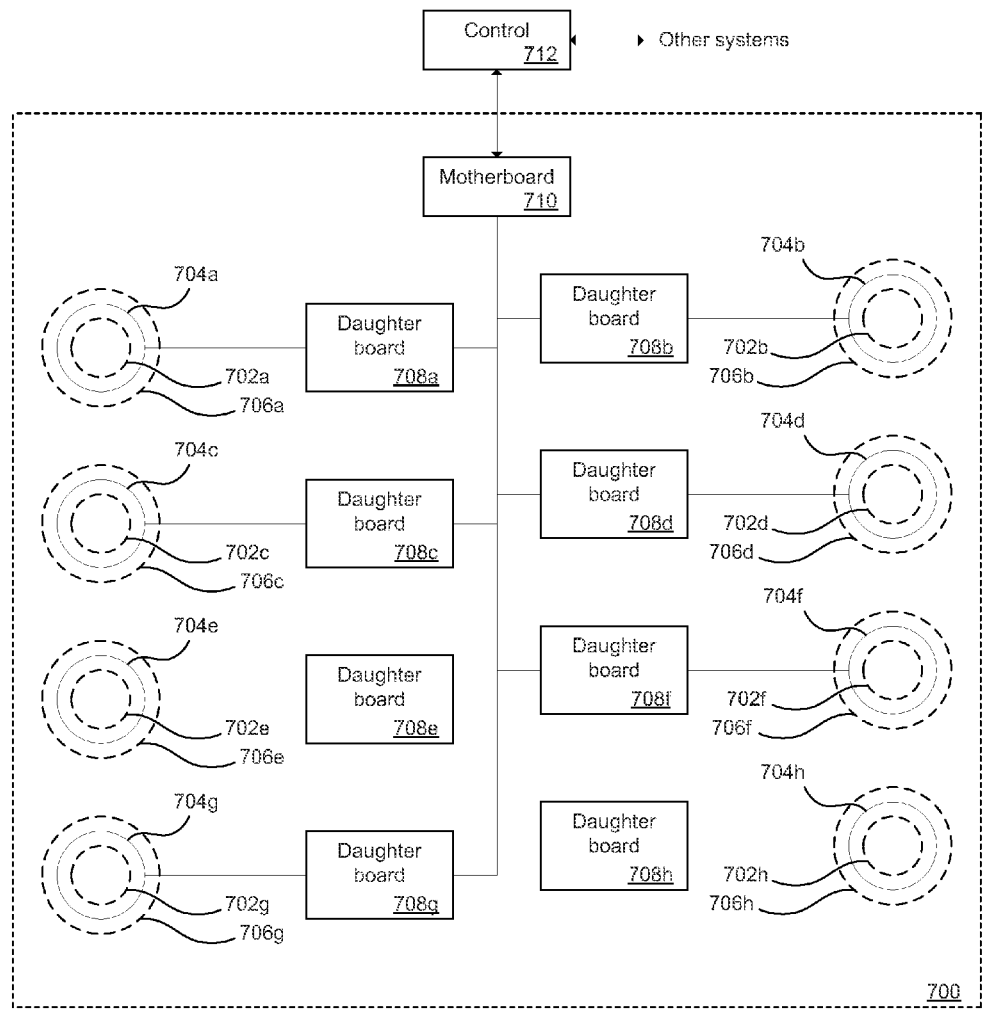
FIG. 6 is a block diagram of a gaming table according to an embodiment of the present invention.

FIG. 6 is a block diagram of a gaming table 700 according to an embodiment of the present invention. In general, the embodiment of FIG. 6 may be referred to as a reader system. The gaming table 700 includes eight betting spots 702a-702h (collectively 702), eight antennas 704a-704h (collectively 704), eight shielding loops (optional) 706a-706h (collectively 706), eight daughter boards 708a-708h (collectively 708), a motherboard 710, and a control system 712. (Some of the description of these components, e.g., the betting spots, the antennas, and the shielding loops, may be repeated from the descriptions of components having similar names that were discussed in previous sections.) The gaming table 700 may be used in conjunction with the ferrite core gaming tokens 102.

The gaming table 700, according to an embodiment, may include one or more of the following attributes:
1. A 13.56 MHz carrier.
2. A "modified Aloha" protocol.
3. A 256 u-sec "data frame" that modulates the carrier.
4. A 16-bit data word for commands to the tokens (140 KHz data rate or 7 u-seconds per bit). According to another embodiment, the data rate is 125 KHz or 8 u-seconds per bit.
5. A 46-bit token ID data (500 KHz data rate or 2 u-seconds per bit; 31 bits for ID plus 13 bits for error detection). According to another embodiment, the data rate is 250 KHz or 4 u-seconds per bit. According to yet another embodiment, a start bit and a stop bit may also be transmitted.

The RF communication uses a 13.56 MHz carrier generated by the motherboard 710 and sent to each daughter board 708. 13.56 MHz was chosen for three reasons: (1) the ferrite cores are permeable at this frequency, (2) data rates are reasonable, (3) FCC frequency allocations for this type of application.

Even though the "ferrite core" concept may not strictly be an RFID technology, the energy and data exchange leverages a "modified Aloha" protocol common to many RFID systems. This protocol was selected because, when there is a good signal to noise ratio and a reasonable estimate of the number of tags in the field is known, it provides a fast read cycle. Characteristics of this modified Aloha protocol include:
1. A "master-slave" command structure with all commands initiated by the reader.
2. A defined number of response "windows". Ideally, the number of windows balances the need to manage collisions (more windows is better) with the desire for fast read cycle times (fewer windows is better).

A complete read cycle begins by turning on the 13.56 MHz carrier signal to power up the tokens in the excitation field and ends when all tokens in the excitation field have been read. Once powered up, the tokens wait for a command. The DSPs on each daughter board 708 modulate the carrier to send commands and data to the tokens at a data rate that the tokens (with only modest processing power) can capture. The number generator process in each token "randomly" assigns a response window. According to an embodiment, the token processor uses the iteration and window size to determine which of the bits in the ID number are used to define a response window. The daughter boards 708 attempt to read the ID of any chips within the range of its antenna. An error detection scheme identifies any collisions. Tokens that are read successfully are put to sleep and the process is repeated. Once all token IDs have been read, the data is sent to the PC.

The token data rate is the fastest that its internal oscillator can drive (250 KHz according to an embodiment); the DSP has the processing horsepower to manage the higher data rate of the down-link from the tokens. This asymmetry in data rates (up-link vs. down-link) aligns with the volume of data to get good read cycle times (much less bandwidth is required for commands than for token IDs). Both the 16-bit commands and the 46-bit IDs fit into the 256 u-sec data frame.

The number and arrangement of the betting spots 702 may be varied depending upon the specifics of the game to be played. In general, a betting spot 702 may be placed anywhere on the table 700 near which a measurement of RFID tags is desired to be made. ("Near" is a relative term that may vary depending upon the specific features implemented in the system. With the specific example configuration described here, "near" produces acceptable read performance at a distance up to approximately 6 inches above the antenna 704.) More specifically, the arrangement of betting spots 702 on the table 700 corresponds to a blackjack game where the only desired information is the IDs of gaming tokens currently being wagered.

The number and arrangement of the antennas 704 generally correspond to the number and arrangement of the betting spots 702. For example, for a given play area, the size of and spacing between the antennas 704 can be adjusted according to a desired performance threshold, and the betting spots 702 conform to the locations of the antennas 704. According to an embodiment, the antenna 704 may be rectangular in shape and 2 inches by 4 inches in size. According to an embodiment, the antenna 704 may be circular in shape and 4 inches in diameter. According to an embodiment, the antenna 704 may be spaced from the (optional) shielding loop 706 by a gap of one-quarter inch. According to an embodiment, the antenna 704 may be constructed on a FR-4 (flame retardant) printed circuit board. According to an embodiment, the antenna 704 may have a thickness of 0.031 inches.

The motherboard 710 can interface to the control system 712 that may be configured to operate in either a local manner or in a remote manner. When the control system 712 is local, the motherboard 710 may be connected via a connection such as USB (universal serial bus). When the control system 712 is remote, the motherboard 710 may be connected via a LAN (local area network) connection such as Ethernet. The Ethernet connection allows the control system 712 to be remotely located to control one or more gaming tables 700 as part of a larger system to monitor fraud or reward loyalty. Alternatively, the USB connection allows the mother board 710 to interface to the local control system 712 to help run demos, de-bug prototypes, and/or integrate diverse systems into a common data format. The local control system 712 can also maintain a copy of the database of "valid" IDs to insure continuous play even in the event of a breakdown in the LAN.

Figure 7:
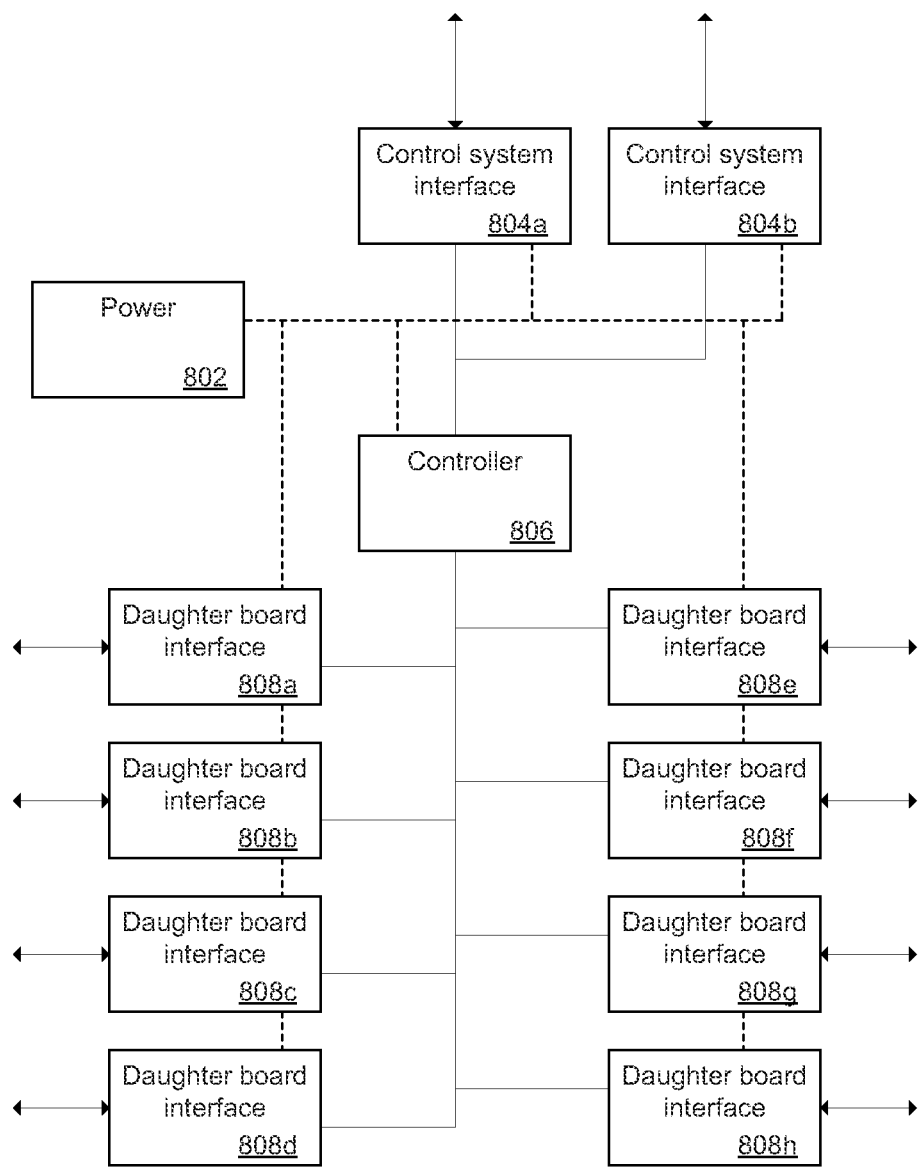
FIG. 7 is a block diagram of a motherboard according to an embodiment of the present invention.

FIG. 7 is a block diagram of the motherboard 710 according to an embodiment of the present invention. The motherboard 710 includes a power supply 802, two control system interfaces 804a and 804b, a controller 806, and eight daughter board interfaces 808a-808h (collectively 808).

The power supply 802 supplies power to the controller 806 and the control system interfaces 804a and 804b.

The controller 806 implements the functionality of the motherboard 710. These functions may include providing power to the daughter boards 708, generating the carrier frequency (e.g., 13.56 MHz) to drive the reader antennas, generating the clock (e.g., 4 KHz) that the daughter boards 708 use to define the command and data windows, formatting the decoded serial data received from the tokens, etc. The controller 806 may be implemented with a complex programmable logic device (CPLD) or other type of circuit structure. According to an embodiment, the controller 806 may be implemented with a XC95144XL-10TQG100C CPLD from Xilinx, Inc., San Jose, Calif.

The control system interface 804a interfaces the motherboard 710 with the control system 712. According to an embodiment, the control system 712 connects to the motherboard 710 in USB format and the controller 806 communicates in serial format, so the control system interface 804a implements a USB-to-serial interface. The control system interface 804a may be implemented by a FT232RL device from Future Technology Devices International Ltd., Glasgow, United Kingdom. According to an embodiment, the control system 712 connects to the motherboard 710 in Ethernet format, so the control system interface 804b implements an Ethernet connection. The control system interface 804b may be implemented by a LPC2368FBD100-S microcontroller from NXP Semiconductors, Eindhoven, The Netherlands.

The daughter board interfaces 808 provide connections between the motherboard 710 and the daughter boards 708. The system designer may choose to add or reduce the number of daughter boards 708 depending on the number of betting spots and the speed at which they must be read. According to an embodiment, one daughter board 708 drives one antenna 704. According to an embodiment, one daughter board 708 drives multiple antennas 704, and the read signals are multiplexed. The number of simultaneous reads will impact the required power.

Figure 8:
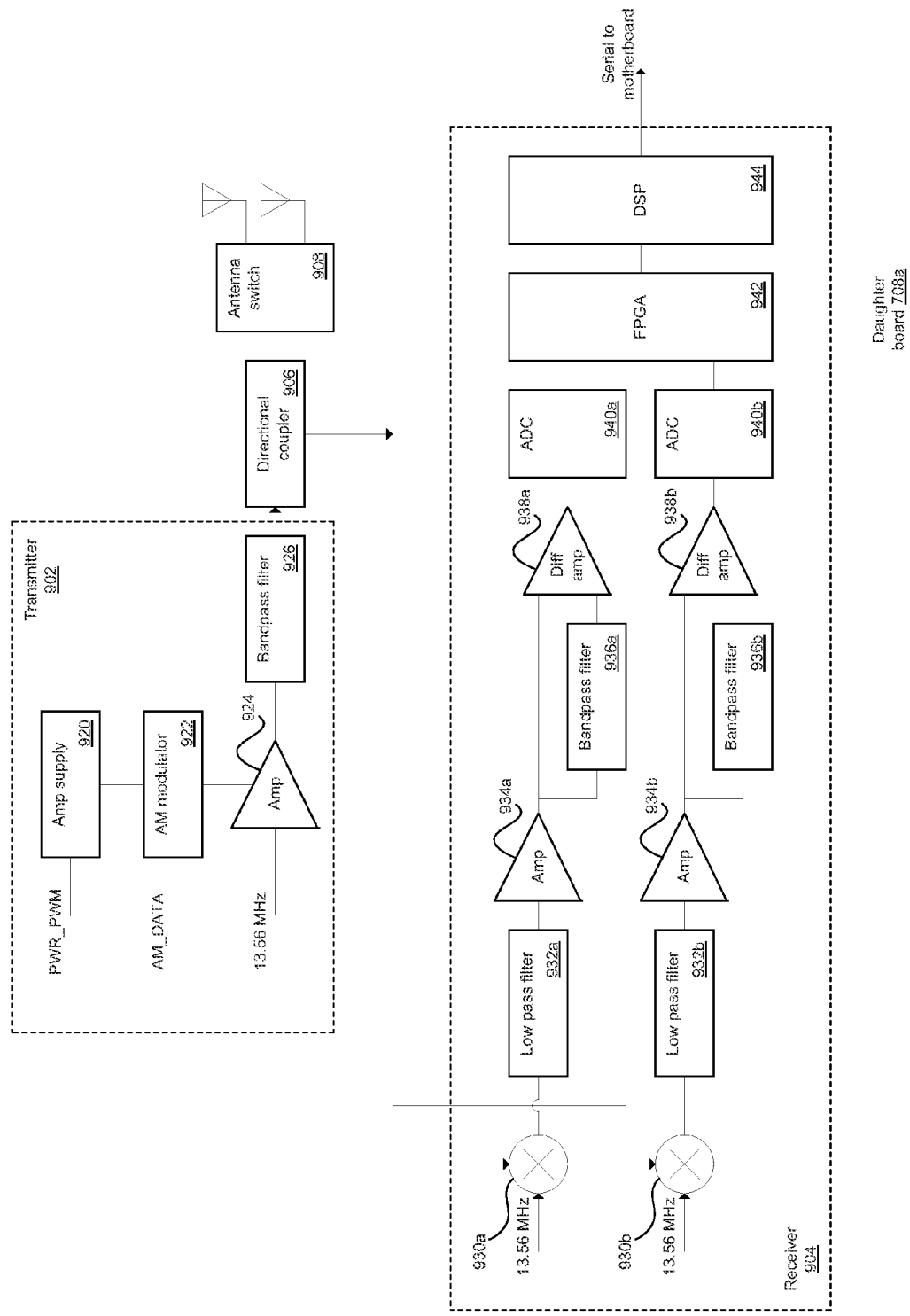
FIG. 8 is a block diagram of a daughter board according to an embodiment of the present invention.

FIG. 8 is a block diagram of the daughter board 708a according to an embodiment of the present invention. The daughter board 708a includes a transmitter 902, a receiver 904, a directional coupler 906, and an antenna switch 908.

The transmitter 902 includes an amp supply 920, an amplitude modulator 922, an amplifier 924, and a bandpass filter 926. The transmitter 902 receives three signals from the motherboard: a power signal PWR_PWM, an amplitude modulated data signal AM_DATA, and the 13.56 MHz carrier signal. The transmitter 902 modulates the data signal onto the carrier signal and provides the modulated carrier signal to the directional coupler 906.

The directional coupler 906 provides the modulated carrier signal to the antenna switch 908, which provides the modulated carrier signal to the antenna 704 for transmission. (According to an embodiment, the daughter board 708a includes two antenna connectors and can drive two antennas. The antenna switch 908 determines which of the antennas are used.) The tags scavenge the transmitted energy and, in response, further modulate the signal with their ID information, which the directional coupler 906 provides to the receiver 904.

The receiver 904 includes mixers 930a and 930b, low pass filters 932a and 932b, amplifiers 936a and 936b, differential amplifiers 938a and 938b, analog to digital converters 940a and 940b, a programmable logic device 942, and a DSP (digital signal processor) 944. The programmable logic device 942 may be a FPGA such as the XC3S250E-4TQG144C device from Xilinx Inc., San Jose, Calif. The DSP 944 may be TMS320F2812PGFA device from Texas Instruments, Dallas, Tex.

The receiver 904 receives the signal as further modulated by the tags (provided by the directional coupler 906) and two versions of the 13.56 MHz carrier frequency (one shifted 90 degrees). The receiver 904 then demodulates the tag ID information and provides serial data to the motherboard 710.

Reader Antenna Details

Figure 9:
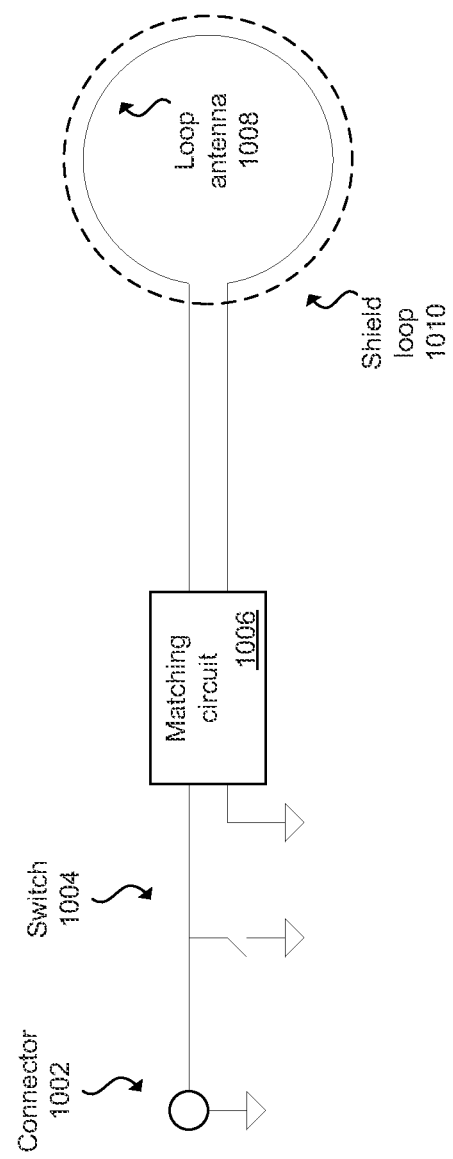
FIG. 9 is a block diagram of an antenna according to an embodiment of the present invention.

FIG. 9 is a block diagram of the antenna 704a according to an embodiment of the present invention. The antenna 704a includes a connector 1002, a switch 1004, a matching circuit 1006, an antenna loop 1008, and a shield loop (optional) 1010. These components may be implemented on a two-sided FR-4 printed circuit board assembly.

The connector 1002 connects the antenna 704a to the daughter board 708. According to an embodiment, the connection to the daughter board 708 is a shielded coaxial cable, and the connector 1002 is a SMA (SubMiniature version A) connector.

The switch 1004 is used to short out the antenna loop 1008 when the antenna loop 1008 is not in use. The switch 1004 is controlled by a DC bias on the antenna cable that may be generated by the daughter card. The switch 1004 acts as an additional shield loop to reduce the field strength in this antenna's betting spot when an adjacent betting spot is being actively driven. This may improve discrimination between tokens in adjacent betting spots.

The matching circuit 1006 may be a 50 Ohm impedance matching circuit.

The antenna loop 1008 may be a loop antenna. The antenna loop 1008 may be in various form factors according to the specifics of the desired betting area and the desired performance. According to an embodiment, the antenna loop 1008 may be in the form of a rectangle sized at 2 inches by 4 inches. According to an embodiment, the antenna loop 1008 may be in the form of a circle with a diameter of 4 inches.

Gaming Token Details

Figure 10A:
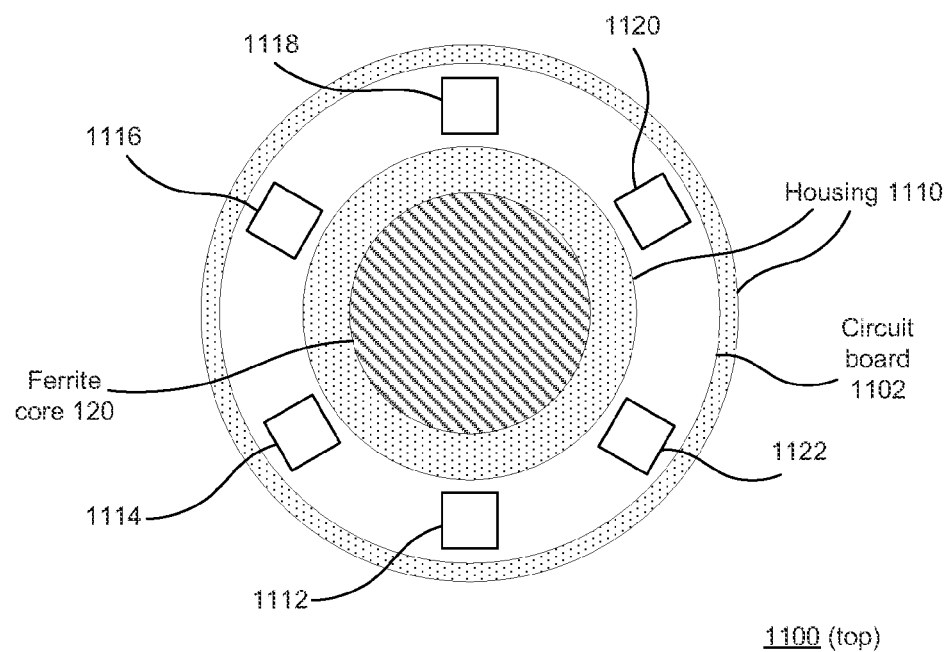
FIG. 10A is a top view (cut away) and FIG. 10B is a bottom view (cut away) of a token according to an embodiment of the present invention.
Figure 10B:
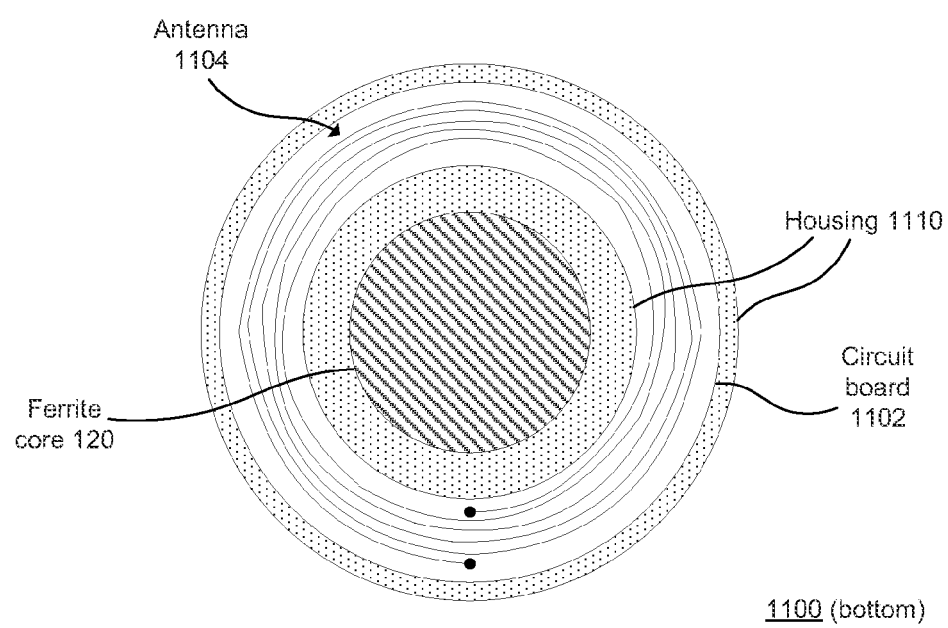
Figure 11:
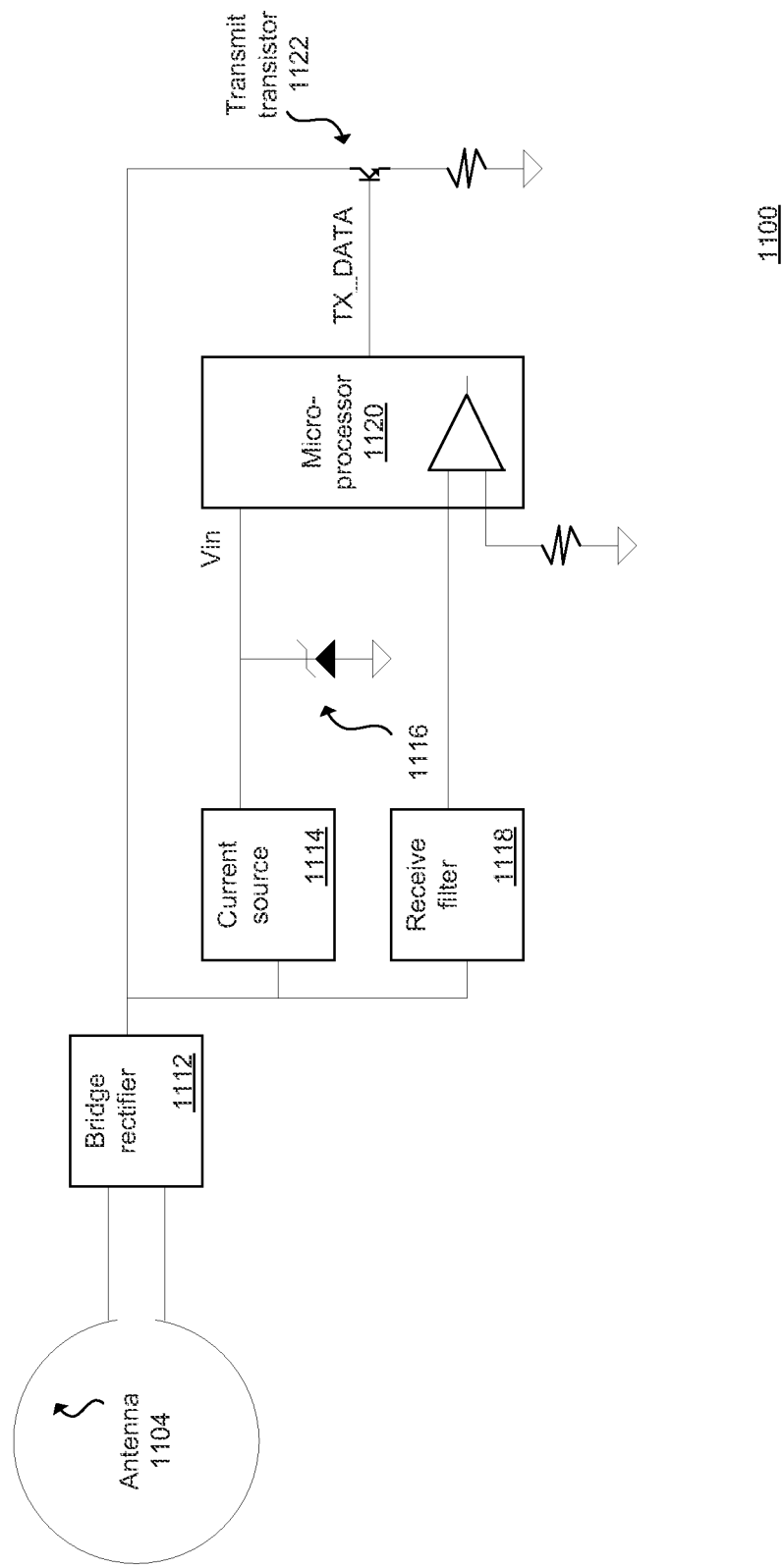
FIG. 11 is a block diagram of a token according to an embodiment of the present invention.

FIG. 10A is a top view (cut away), FIG. 10B is a bottom view (cut away), and FIG. 11 is a block diagram, of a token 1100 according to an embodiment of the present invention. The token 1100 generally includes a ferrite core, an antenna, and tag electronics. More specifically, the token 1100 includes a printed circuit board 1102, an antenna 1104, the ferrite core 120, a plastic housing 1110, a bridge rectifier 1112, a current source 1114, a shunt voltage regulator 1116, a receive filter 1118, a microprocessor 1120, and a transmit transistor 1122.

The token 1100 may be a gaming token such as is suitable for use in casinos. The token 1100 may be circular with a diameter of 1.55 inches (39.4 mm) and a thickness of 0.125 inches (3.18 mm). These parameters may be varied as desired.

The printed circuit board 1102 may be generally circular in shape, in order to conform to the form factor of circular gaming tokens. The printed circuit board 1102 may be of FR-4 material and 0.020 inches in thickness.

The antenna 1104 may be an 8-turn antenna etched on one side (e.g., the bottom) of the circuit board 1102. These antennas may be constructed with 8 mil traces and 7 mil spacing. The inductance of the 8 turn antenna may be 3 uH. Antennas with different numbers of turns may be implemented with a different balance between inductance and resistance, according to design needs.

Many existing RFID tags use a diode rectifier followed by a voltage clamp to limit the required operating voltage range of the tag and thereby protect the tag from over-voltage. In this embodiment, the power supply may be a linear power supply where there is a bridge rectifier 1112 followed by a current source 1114 and then a voltage clamp (shunt voltage regulator) 1116. This architecture does not clamp the voltage across the coil as is typically done in RFID tags. This linear supply allows tags to operate over a broad range of magnetic field intensities. This allows tags to be read on the top of the stack—where the field is lowest—and near the bottom of the stack—where the field is highest. The net effect is an increased read range. The linear power supply may be as described in U.S. Pat. No. 8,395,525 for "Extending the Read Range of Passive RFID Tags" filed Feb. 25, 2009.

The microprocessor 1120 may be a PIC microcontroller from Microchip Technology Inc., Chandler, Ariz. The microprocessor 1120 stores the ID of the token 1100, decodes commands from the reader, and encodes the ID of the token 1100 onto the 13.56 MHz carrier. The microprocessor 1120 includes an internal comparator that is coupled to the receive filter 1118.

The ferrite core 120 may be as described above (see, for example, FIG. 1B). The ferrite core 120 harnesses the H-field and steers it through the antenna 1104. The primary physical attribute of the ferrite is its permeability. Any equivalent material that is permeable and effectively steers the H-field through the antenna loop will improve performance. Ferrite devices are commonly used with frequencies up to 1 GHz. According to an embodiment, the ferrite core 120 has a permeability of 125, plus or minus 20% (e.g., between 100 and 150).

According to an embodiment, the ferrite core 120 is made of a high frequency perminvar NiZn ferrite with a range of inductive applications up to 25 MHz with low losses. A suitable material is the "M" Material from National Magnetics Group, Inc., Bethlehem, Pa. According to an embodiment, the ferrite core 120 is a molded plastic material with a ferrous filler or a ferrous additive. Other materials that may be used are powdered iron, ground up ferrite, soft iron, or a nickel-iron-molybdenum alloy (e.g., molypermalloy), although they may be generally better suited to frequencies lower than 13.56 MHz.

According to an embodiment, the frequency of 13.56 MHz may be used. Different frequencies may be used in other embodiments.

The ferrite core 120 has a thickness that generally conforms to the form factor of the token 1100. For example, the ferrite core 120 may have a thickness of 3.175 mm.

The ferrite core 120 has a diameter that generally conforms to the form factor of the token 1100 and the other internal components. For example, the ferrite core 120 may have a diameter of 12.7 mm. This diameter allows tokens to be mis-aligned in a stack and provide sufficient overlap between adjacent tokens such that flux up the stack is not degraded (i.e., performance is not sensitive to how well the stack is aligned). Practical ranges for the diameter of the ferrite in standard (round) gaming tokens can be as small as 2 mm and as large as 35 mm, depending on other physical requirements. Other form factors such as the use of "plaques" may allow greater freedom in the choice and location of the ferrite element(s). For example, a rectangular plaque may include two circular ferrite cores 120.

The size of the ferrite core may be increased or decreased according to the form factor of the token 1100 and the desired performance characteristics. As long as it fits, there is no reason one could not make the ferrite core 120 bigger in diameter. As long as there is sufficient overlap to not degrade flux up the stack, one could make the ferrite smaller in diameter. There does not appear to be much sensitivity to space between antenna windings and the outside diameter of the ferrite.

The ferrite core 120 may be circular in shape but any shape that fits inside the antenna loop is acceptable. The circular shape was chosen for symmetry and ease of manufacture. The ferrite core 120 may be positioned at locations other than the center of the token 1100 if desired.

According to an embodiment, the diameter of the ferrite core 120 may be increased up to the diameter of the token. The antenna may be wrapped around an outer edge of the token.

The top and bottom of the token 1100 may be covered with labels or stickers (not shown) to denote the denomination or other desirable information. The label may have a thickness of approximately 0.003 inches. This thickness minimizes any air gaps when the tokens are stacked (that is, it helps the ferrite cores in a stack of tokens to function as if they were a single monolithic rod of ferrite). The thickness of the label may be varied, as desired, with corresponding effects on the read performance. Alternately, the ferrite core may be exposed by using an annular sticker to further minimize any air gaps in the stack. The gap performance of between two tokens 1100 is given in TABLE 3, according to an embodiment.

TABLE 3

| | Gap | | | | | |
|---|---|---|---|---|---|---|
| | 0% | 1.75% | 2.5% | 4.5% | 9% | 17.5% | 23.5% |
| Gain (dB) | 24 | 19 | 15.5 | 13 | 10 | 7 | 5.5 |

The "gap" refers to the space between ferrite cores 120, as a percentage of the thickness of each. (For example, a gap of 20% for a thickness of 3 mm corresponds to a 0.6 mm gap.) The gap may result from a label as described above, from a more robust covering for the token 1100, from debossed features on the token 1100, etc. The "gain" refers to the increased signal strength for tokens 1100 having the ferrite core 120 as compared to a token lacking the ferrite core 120. Thus, TABLE 3 shows that for a gap between 0% and 1.75%, the gain is between 24 dB and 19 dB. The information in TABLE 3 is dimensionless; that is, it does not depend upon the number of tokens 1100 in a stack.

The ferrite cores 120 can be manufactured either by cutting them from a solid rod or by sintering them in a special tool. Sintering allows the addition of aesthetic elements to be debossed on either one or both facets of the ferrite with little degradation in their performance. Furthermore, sintering allows the designer to add features to allow insert molding of the ferrites during the molding of the tokens.

According to an embodiment, ferrous material or small ferrite beads may be added to a plastic matrix, which is then used to mold part or all of the token 1100. In such an embodiment, the ferrite core 120 and the token 1100 refer to the same structure, and a separate element for the ferrite core 120 is not required.

According to an embodiment, more than one ferrite core may be in a token. According to an embodiment, a token may include more than one RFID tag (e.g., the tag electronics may provide multiple tag IDs for a token). According to an embodiment, more than one antenna may be in a token.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A gaming token including a radio frequency identification (RFID) tag, comprising:
   a magnetically permeable core;
   an antenna that receives electromagnetic energy via a component of an electromagnetic field that is orthogonal to the antenna; and
   tag electronics, coupled to the antenna, that identify the RFID tag in response to receiving the electromagnetic energy,
   wherein the RFID tag is one of a plurality of RFID tags that, when stacked, result in a stack with a plurality of magnetically permeable cores that vertically steers a magnetic flux field up through the stack.

2. The RFID tag of claim 1, wherein the magnetically permeable core deforms a magnetic flux component of the electromagnetic energy.

3. The RFID tag of claim 2, wherein the magnetic flux component having been deformed concentrates flux lines through the magnetically permeable core.

4. The RFID tag of claim 3, wherein the flux lines having been concentrated couple the electromagnetic energy to the antenna with an increased efficiency as compared to lacking the magnetically permeable core.

5. The RFID tag of claim 1, wherein the magnetically permeable core steers the magnetic flux field of the RFID tag, wherein the magnetic flux field results from the electromagnetic energy, and wherein steering the magnetic flux field increases a read range of the RFID tag.

6. The RFID tag of claim 1, wherein the magnetically permeable core improves an efficiency of energy transfer from a reader device that generates the electromagnetic energy to the RFID tag.

7. The RFID tag of claim 1, wherein the magnetically permeable core improves an efficiency of data transfer from a reader device that generates the electromagnetic energy to the RFID tag.

8. The RFID tag of claim 1, wherein the magnetically permeable core improves an efficiency of data transfer from the RFID tag to a reader device that generates the electromagnetic energy.

9. The RFID tag of claim 1, wherein the tag electronics identifies the RFID tag by modulating a carrier frequency of the electromagnetic energy.

10. The RFID tag of claim 1, wherein the tag electronics identifies the RFID tag by modulating a carrier frequency of the electromagnetic energy according to a modified Aloha protocol.

11. The RFID tag of claim 1, wherein the antenna is an annular antenna that surrounds the magnetically permeable core.

12. The RFID tag of claim 1, wherein the antenna has a Q of less than 5.

13. The RFID tag of claim 1, wherein the antenna has a Q of less than 1.

14. The RFID tag of claim 1, wherein the antenna is untuned.

15. The RFID tag of claim 1, wherein the RFID tag further comprises:
   a set of magnetically permeable cores that includes the magnetically permeable core.

16. The RFID tag of claim 1, wherein the RFID tag further comprises:
   a plurality of tag electronics that includes the tag electronics and that provides a plurality of identifications of the RFID tag.

17. The RFID tag of claim 1, wherein the RFID tag further comprises:
   a plurality of antennas that includes the antenna.

18. The RFID tag of claim 1, wherein the antenna is configured to receive the electromagnetic energy that passes through a top side and a bottom side of the RFID tag.

19. The RFID tag of claim 1, wherein the antenna is configured to receive the electromagnetic energy via the component of the electromagnetic field that is orthogonal to the antenna as directed by the magnetically permeable core.

20. The RFID tag of claim 1, wherein the stack has a gap of 0% to 9% between each magnetically permeable core of the plurality of RFID tags in the stack.

21. The RFID tag of claim 1, wherein the stack results from the plurality of RFID tags being overlapping and misaligned in the stack.

22. The RFID tag of claim 1, wherein the antenna is detuned.

23. The RFID tag of claim 1, wherein the antenna is detuned to result in a read range that is decreased, and wherein the magnetically permeable core results in the read range being increased.

24. The RFID tag of claim 1, wherein the electromagnetic energy has a carrier frequency, and wherein the antenna has a resonant frequency that is above the carrier frequency.

25. The RFID tag of claim 1, wherein the electromagnetic energy has a carrier frequency of 13.56 MHz, and wherein the antenna has a resonant frequency that is above the carrier frequency.

26. The RFID tag of claim 1, wherein the stack has a gap of 0% between each magnetically permeable core of the plurality of RFID tags in the stack.

27. The RFID tag of claim 1, wherein the stack has a plurality of gaps, wherein the plurality of gaps are between the plurality of RFID tags in the stack.

28. The RFID tag of claim 1, wherein the stack has a plurality of gaps, wherein the plurality of gaps are between the plurality of RFID tags in the stack, and wherein the plurality of RFID tags in the stack function as if they were a single monolithic rod of ferrite.

29. A plurality of gaming tokens including a plurality of RFID tags, wherein each RFID tag of the plurality of RFID tags comprises:
  a magnetically permeable core;
  an antenna that receives electromagnetic energy via a component of an electromagnetic field that is orthogonal to the antenna; and
  tag electronics, coupled to the antenna, that identify each RFID tag in response to receiving the electromagnetic energy,
  wherein when the plurality of RFID tags is stacked, a stack with a plurality of magnetically permeable cores results that vertically steers a magnetic flux field up through the stack.

30. The plurality of RFID tags of claim 29, wherein an increased signal strength between 24 dB and 10 dB results for a gap between 0% and 9%, wherein the gap is between a first magnetically permeable core of a first RFID tag and a second magnetically permeable core of a second RFID tag.

31. The plurality of RFID tags of claim 29, wherein the plurality of RFID tags includes a first RFID tag having a first magnetically permeable core and a second RFID tag having a second magnetically permeable core, wherein the first magnetically permeable core and the second magnetically permeable core steer a magnetic flux when the first magnetically permeable core and the second magnetically permeable core are overlapping and misaligned.

32. A radio frequency identification (RFID) system, comprising:
  a reader system that generates electromagnetic energy; and
  a gaming token that has an RFID tag, wherein the RFID tag includes:
    a magnetically permeable core;
    an antenna that receives the electromagnetic energy via a component of an electromagnetic field that is orthogonal to the antenna; and
    tag electronics, coupled to the antenna, that identify the RFID tag in response to receiving the electromagnetic energy,
    wherein the RFID tag is one of a plurality of RFID tags that, when stacked, result in a stack with a plurality of magnetically permeable cores that vertically steers a magnetic flux field up through the stack.

33. The RFID system of claim 32, wherein the reader system comprises:
  a plurality of reader antennas that generate the electromagnetic energy to read the RFID tag in proximity to one of the reader antennas.

* * * * *